United States Patent
Kurz et al.

(10) Patent No.: US 9,835,487 B2
(45) Date of Patent: Dec. 5, 2017

(54) OPERATING A HIGH ACCURACY THERMAL ANEMOMETER FLOW METER IN GAS STREAM CONTAINING LIQUID DROPLETS

(71) Applicant: Los Robles Advertising, Inc., Monterey, CA (US)

(72) Inventors: Daniel R. Kurz, Salinas, CA (US); Bruce B. Burton, Royal Oaks, CA (US); Ralph A. Dalla Betta, Saratoga, CA (US)

(73) Assignee: LOS ROBLES ADVERTISING, INC., Monterey, CA (US)

( * ) Notice: Subject to any disclaimer, the term of this patent is extended or adjusted under 35 U.S.C. 154(b) by 0 days.

(21) Appl. No.: 15/338,497

(22) Filed: Oct. 31, 2016

(65) Prior Publication Data

US 2017/0045393 A1   Feb. 16, 2017

Related U.S. Application Data

(63) Continuation of application No. 14/345,651, filed as application No. PCT/US2013/075867 on Dec. 17, 2013, now Pat. No. 9,506,791.

(Continued)

(51) Int. Cl.
*G01F 1/68*  (2006.01)
*G01F 25/00* (2006.01)
(Continued)

(52) U.S. Cl.
CPC ......... *G01F 25/0053* (2013.01); *G01F 1/684* (2013.01); *G01F 1/74* (2013.01);
(Continued)

(58) Field of Classification Search
CPC ........ G01F 1/6965; G01F 1/696; G01F 1/698; G01F 1/86; G01F 1/684; G01F 1/74; G01F 5/00; G01F 5/0053
USPC ...... 73/861, 170.12, 204.11, 204.17, 204.18, 73/861.04, 861.85, 202.5, 29.01, 61.43, 73/61.46
See application file for complete search history.

(56) References Cited

U.S. PATENT DOCUMENTS

| 5,854,425 A | 12/1998 | Sarma |
| 6,487,904 B1 | 12/2002 | Myhre |
| (Continued) | | |

FOREIGN PATENT DOCUMENTS

| EP | 2045584 A2 | 4/2009 |
| EP | 2189764 A2 | 5/2010 |
| GB | 2470941 A | 12/2010 |

OTHER PUBLICATIONS

PCT/US13/75867 International Search Report and Written Opinion dated Jun. 26, 2014, 9 pages.

*Primary Examiner* — Jonathan Dunlap
(74) *Attorney, Agent, or Firm* — Patent Law Group LLP; David C. Hsia

(57) ABSTRACT

A method is provided to operate a thermal anemometer flow meter to measure a property of a stream. The method includes measuring a first heat loss to the stream from operating at a first DeltaT above a temperature of the stream, measuring a second heat loss to the stream from operating at a second DeltaT above the temperature of the stream where the second DeltaT being greater than the first DeltaT. The method further includes determining the property of the stream based on the first and the second heat losses.

10 Claims, 7 Drawing Sheets

Related U.S. Application Data

(60) Provisional application No. 61/737,861, filed on Dec. 17, 2012.

(51) Int. Cl.
  G01F 1/684 (2006.01)
  G01F 1/86 (2006.01)
  G01F 1/74 (2006.01)
  G01F 1/696 (2006.01)
  G01F 1/698 (2006.01)
  G01F 5/00 (2006.01)

(52) U.S. Cl.
  CPC .............. G01F 1/86 (2013.01); *G01F 1/696* (2013.01); *G01F 1/698* (2013.01); *G01F 1/6965* (2013.01); *G01F 5/00* (2013.01)

(56) References Cited

U.S. PATENT DOCUMENTS

| | | |
|---|---|---|
| 6,739,178 B2 | 5/2004 | Dimarzo et al. |
| 6,883,369 B1 | 4/2005 | Myhre |
| 7,418,878 B2 | 9/2008 | Burton |
| 7,647,843 B2 | 1/2010 | Burton |
| 7,653,503 B2 | 1/2010 | Mangalam et al. |
| 8,042,409 B2 | 10/2011 | Moller |
| 8,549,908 B2 | 10/2013 | Dalla Betta et al. |
| 8,607,642 B2 | 12/2013 | Kurz et al. |
| 2003/0209056 A1 | 11/2003 | Dimarzo et al. |
| 2007/0250276 A1 | 10/2007 | Mangalam et al. |
| 2008/0066541 A1 | 3/2008 | Burton |
| 2008/0148840 A1 | 6/2008 | Zimmermann et al. |
| 2008/0295590 A1 | 12/2008 | Sukegawa et al. |
| 2009/0084177 A1 | 4/2009 | Ao et al. |
| 2011/0290035 A1 | 12/2011 | Wee et al. |
| 2011/0308311 A1 | 12/2011 | Dalla Betta et al. |
| 2013/0152698 A1 | 6/2013 | Kurz et al. |

US 9,835,487 B2

1

OPERATING A HIGH ACCURACY THERMAL ANEMOMETER FLOW METER IN GAS STREAM CONTAINING LIQUID DROPLETS

CROSS REFERENCE TO RELATED APPLICATIONS

This application is a continuation of U.S. patent application Ser. No. 14/345,651, filed Mar. 19, 2014, to be issued as U.S. Pat. No. 9,506,791, which is a 371(c) national stage entry of PCT/US2013/75867, filed Dec. 17, 2013, which claims priority to U.S. Provisional Patent Application No. 61/737,861, filed Dec. 17, 2012. U.S. Ser. No. 14/345,651, PCT/US2013/75867, and U.S. Ser. No. 61/737,861 are incorporated by reference in their entirety.

This application is related to U.S. Pat. No. 8,549,908, U.S. Pat. No. 8,607,642, U.S. patent application Ser. No. 13/869,953, filed on Apr. 24, 2013, and U.S. Patent App. Ser. No. 61/916,936, filed on Dec. 17, 2013, which are commonly assigned and incorporated herein by reference.

FIELD OF INVENTION

This invention relates to methods and apparatus to measure properties of a wet gas flow, and in particular vapor mass flow, liquid mass flow, and steam quality.

DESCRIPTION OF RELATED ART

Thermal anemometer type flow meters have a very wide dynamic range, 100:1 and in some cases up to 1000:1. In addition, they have good durability, good accuracy, fast response, and high repeatability, and they have long proven themselves in the measurement of dry gas flow in a variety of applications. However, thermal anemometer type flow meters are very sensitive to liquid in the gas stream since any liquid contacting the sensor probes will cause a high reading due to the cooling of the anemometer by thermal conduction to the liquid or vaporization of the liquid as it impacts the surface of the heated portion. Nonetheless, the significant advantages of a thermal anemometer type flow meter make it highly desirable to develop one that can operate in wet gas flows and measure properties such as the vapor mass flow only, the liquid mass flow only, or total vapor and liquid mass flow. One particular application of interest would be to measure the total mass flow and the fractional mass flow that is liquid. When applied to a saturated steam flow, this measurement is termed the steam quality, which is the ratio of the mass flow of water vapor to the total mass flow of water vapor plus liquid.

BRIEF DESCRIPTION OF THE DRAWINGS

In the drawings.

Use of the same reference numbers in different figures indicates similar or identical elements.

DETAILED DESCRIPTION

A thermal anemometer is operated by heating a probe or some other temperature sensing element in a flowing stream or fluid above the stream temperature and measuring the power required to maintain the probe at a target temperature. The power is a function of the stream velocity and the velocity can be determined from a calibration function or a calibration curve. The temperature that a thermal anemometer is heated above the stream temperature is generally referred to as DeltaT, overheat, or temperature increase. Herein this temperature increase is referred to as DeltaT. CTA (constant temperature anemometer) or CDTA (constant delta temperature anemometer) uses circuit design or microprocessor control to hold a heated probe at a relatively fixed temperature or at a fixed temperature above the stream temperature. Another type of anemometer is the CPA (constant power anemometer) that controls the power to the heated probe at a fixed level and then monitors the probe temperature, which is a function of the stream velocity that decreases as the stream velocity increases. The probe temperature is then correlated with the stream velocity through a calibration curve or calibration function. Combinations of these operating modes are also used where both temperature and power are monitored and related to the stream velocity. In all of these modes of operation of the thermal anemometer, a probe or element is heated above the stream temperature and the heat loss from the heated element is monitored by following some property of the heated element and correlating this property with the stream velocity. In all of these cases, the temperature rise above the stream temperature can be referred to as DeltaT.

Figure 1:
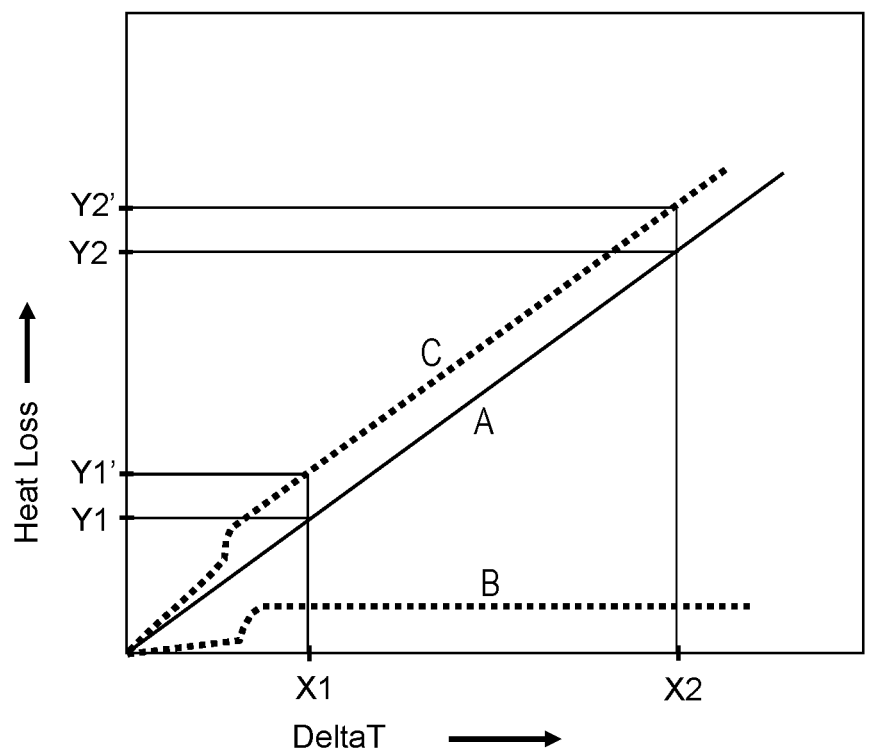
FIG. 1. is a chart illustrating heat loss characteristics of a thermal anemometer probe in a dry and wet vapor stream.

While it is unexpected that operating a heated probe at a high DeltaT above the fluid temperature should reduce and even eliminate the effect of liquid droplets in the gaseous stream, this was shown to be the case in co-pending application U.S. patent application Ser. No. 13/869,953. FIG. 1 shows the heat loss from a heated probe in a constant velocity gas stream. As the DeltaT is increased along the abscissa, the heat loss from the heated probe, shown on the ordinate axis, due to gas phase convection to the gas flow increases approximately linearly as shown by curve A. If liquid droplets or a mist is present in the flow, the heat loss due to the liquid impacting the heated probe would have the general shape shown in curve B. At low DeltaT, where the probe temperature is below the boiling point of the liquid, the probe would lose heat as the liquid film is heated to the probe temperature, resulting in a slight rise in the heat loss to the liquid as the probe temperature (DeltaT) is increased. When the heated probe temperature approaches and passes the boiling point of the liquid, the heat loss will rise sharply as the liquid film on the probe is vaporized. As DeltaT is increased further, the heat loss due to the liquid will remain nearly constant. The total heat loss from the heated probe is shown as the sum of these two components, curve C. At some low DeltaT temperature such as X1, the error caused by the liquid, (Y1'−Y1)/Y1, would be large. At some high DeltaT temperature such as X2, the error due to the liquid would be small, (Y2'−Y2)/Y2). The magnitude of the error due to liquid droplets or mist will be a function of the magnitude of the DeltaT, the amount of liquid present in the gaseous stream, and the gas velocity. But as shown in FIG. 1, by operating at a high DeltaT, the error from the liquid can be small and this mode of operation can provide a measurement of vapor (gas) velocity that has only a small error.

Figure 2A:
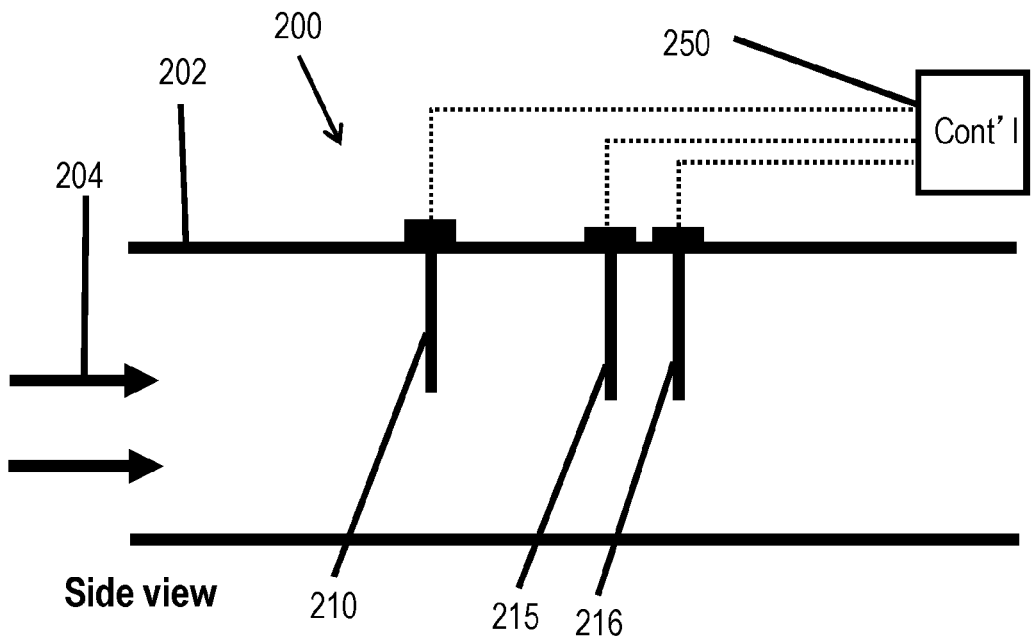
FIGS. 2A and 2B respectively illustrate side and top views of a thermal anemometer probe arrangement for measuring wet gas flow in examples of the present disclosure.
Figure 2B:
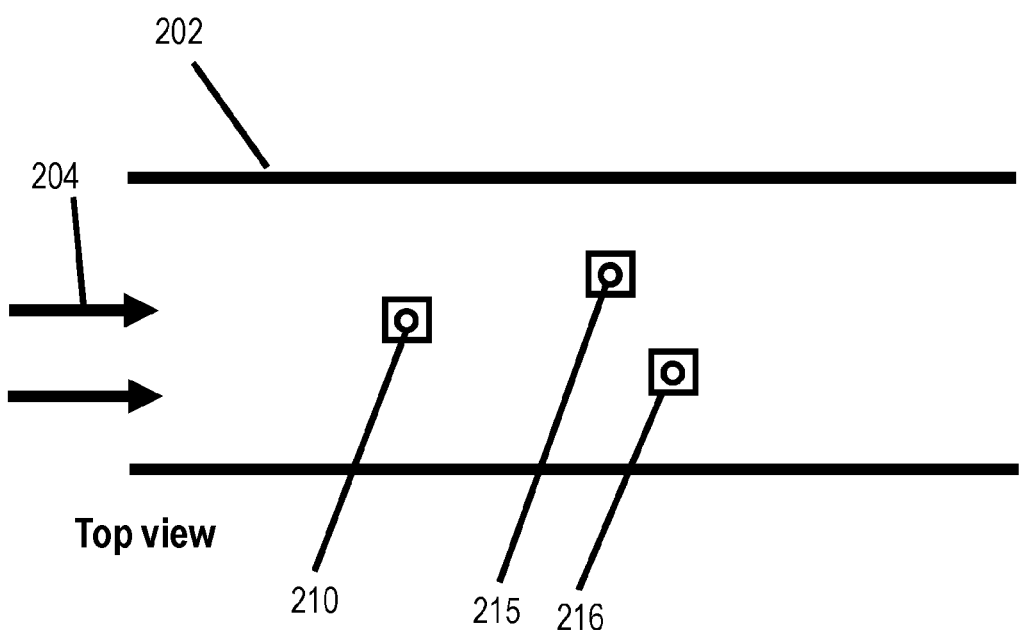

Another unexpected discovery is that by making two measurements at two different DeltaT operating points, the small error in the result from the high DeltaT probe can be partially or fully corrected to give a more accurate flow measurement. FIGS. 2A and 2B show side and top views, respectively, of a wet gas flow meter 200 in one or more embodiments of the present disclosure. Flow meter arrangement 200 is placed in a duct 202 with a wet gas flow 204. Thermal anemometer probes 210, 215, and 216 are placed in the duct so that flow 204 passes over these probes. Probe 210 is placed generally upstream of probes 215 and 216, and probes 215 and 216 are shown substantially adjacent to each other but not in the same line parallel with the flow direction. Probes 215 and 216 can be arranged in the same axial location or arranged upstream and downstream of each other as shown in FIG. 1B. In addition, the probes can be inserted from the top of the duct (12 o'clock) as shown, from the side (3 o'clock), from the bottom (6 o'clock), or any other angle. As shown in co-pending U.S. patent application Ser. No. 13/869,953, in one example probes 215 and 218 are inserted from about 4 to 5 o'clock to about 7 to 8 o'clock. Probe 210 is a reference probe and measures the temperature of flowing stream 204. Probes 215 and 216 are heated to some temperature above the stream temperature as measured by probe 210.

Herein, the term probe refers to an element inserted into the flow stream to measure temperature of the stream or heat loss from the probe to the stream when the probe temperature is above the stream temperature. The probe can take a number of forms such as a metal or other tube containing a temperature measuring element, a separate heater and a separate temperature measuring element within the probe, or an electrical component that can be heated and also measures temperature. The probe can be cylindrical or flat or take any shape. Alternatively, temperature measuring circuits and/or heaters can be formed on the surface of a ceramic, a semiconductor device or planar structure, or any other design that could be placed in a flowing stream to measure stream flow or velocity. Alternatively, the heater and temperature measuring element can be formed on the surface of the stream duct. The examples of the present disclosure may take any of the forms applied to thermal anemometer type devices known in the art.

In general, DeltaT refers to the temperature of the temperature measuring electrical element inside the probes 215 and 216. However, since probes 215 and 216 are constructed so that there is good thermal contact between the outer surface of the probe and the temperature measuring element inside the probe, the measuring element and the outer surface of the probe are essentially at the same temperature or are only different by a small amount. DeltaT can refer to both the temperature of the temperature measuring element inside the probe and to the temperature of the outer surface of the probe. Also, the probe can consist of a single electrical element that is heated and measures temperature, or separate heater and temperature sensing element. DeltaT can be a fixed value as might be the case in a CTA or CDTA type anemometer were temperature is controlled, or DeltaT can vary with flow velocity in the case of a CPA type device. The description herein assumes a CDTA type device but similar performance could be obtained for CTA, CPA, and other anemometer types.

Figure 3A:
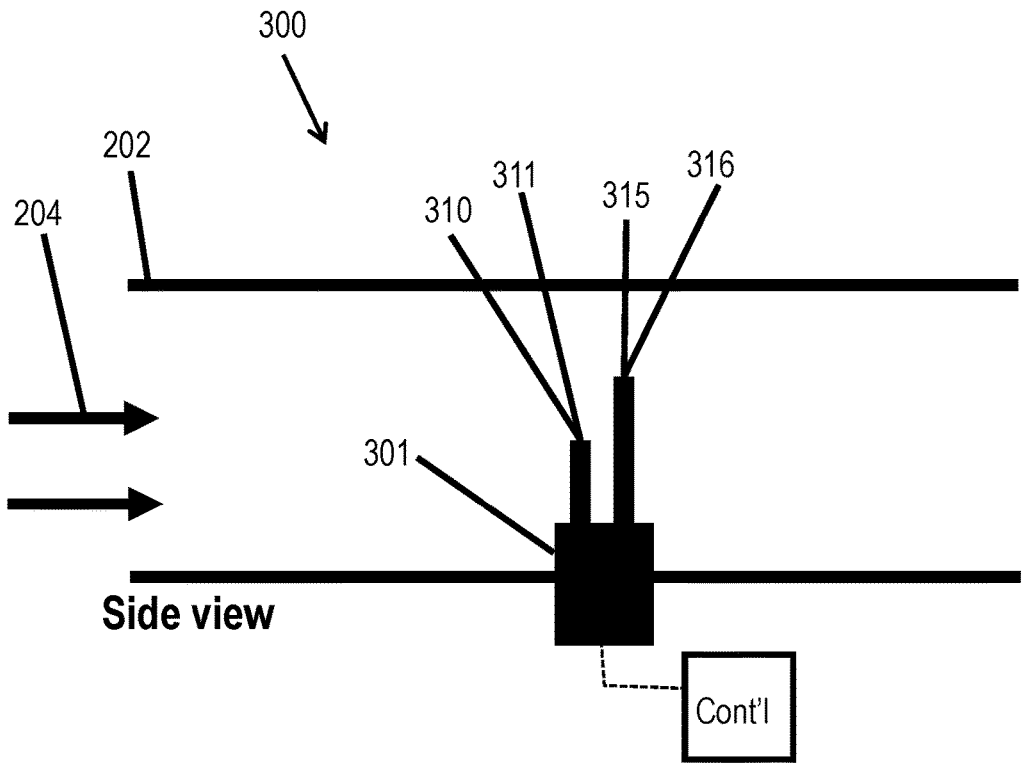
FIGS. 3A and 3B respectively illustrate side and top view of another thermal anemometer probe arrangement for measuring wet gas flow in examples of the present disclosure.
Figure 3B:
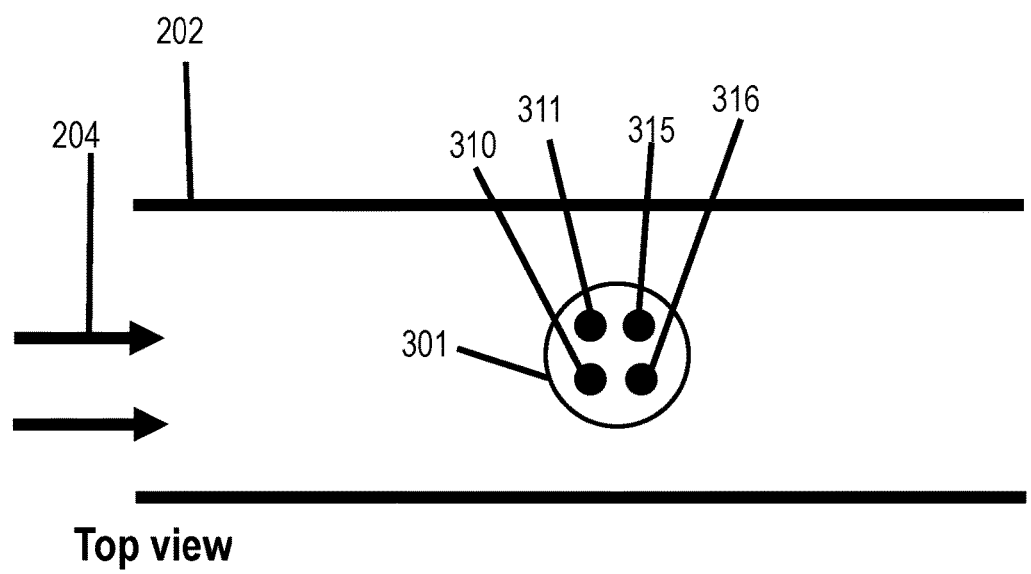

While the examples shown in FIG. 2 include two heated probes 215 and 216 as separate sensors and an unheated probe 210 in yet another sensor to measure the stream temperature, they could be incorporated into a single sensor unit that combines all three probes. One example where the probes are combined in a single sensor is shown in FIG. 3. In FIG. 3, a single sensor 301 has two unheated probes 310 and 311 to measure stream temperature, and two heated probes 315 and 316 with one operated at a high DeltaT and one operated at a lower DeltaT. Alternative physical arrangements from those shown in FIG. 3 are possible with alternative arrangements of the high DeltaT and low DeltaT probes. The sensor could also have a single unheated probe to measure the stream temperature and two heated probes. In one example a sensor has a single unheated probe and a single heated probe where the heated probe is operated for some period of time at a high DeltaT and a heat loss value is measured, and then the DeltaT is reduced to the lower DeltaT and a second heat loss value is measured. In another example a sensor has a single probe that is operated in three modes: an unheated mode to measure the stream temperature, a first heated mode at DeltaT1 to measure a first heat loss value, and a second heated mode at DeltaT2 to measure a second heat loss value.

Figure 4:
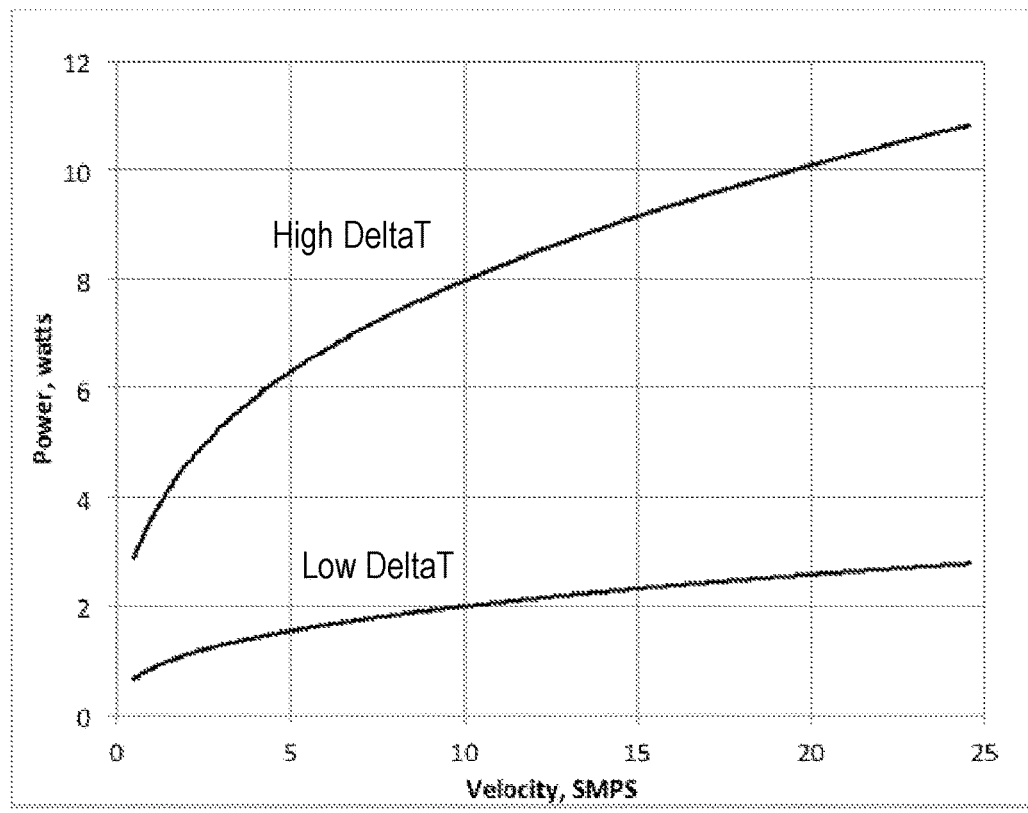
FIG. 4 is a chart illustrating calibration curves for thermal anemometer probes operating at a high DeltaT and a low DeltaT in examples of the present disclosure.

In the operation of thermal anemometer probes such as those shown in FIG. 2 and FIG. 3 in a dry gas flow, the power input to control a probe at a target DeltaT temperatures above the temperature of stream 204 would be a function of the mass flow rate of stream 204. As an example, DeltaT1 is set at 100° C. and DeltaT2 is set at 300° C. When placed in stream 204 and the mass flow rate of stream 204 is increased, the power inputs to probes 215, 216 or 315, 316 would increase to maintain DeltaT1 at 100° C. and DeltaT2 at 300° C. A calibration curve can be generated for each probe relating input power to the dry gas mass flow rate. FIG. 4 shows a calibration curve for a low DeltaT and for a high DeltaT in examples of the present disclosure. In the case where steam 204 is a wet gas flow containing liquid droplets, any liquid droplet impacting probes 215, 216 or 315, 316 would coat the probes and be heated by the probes or, if the probes are at sufficiently high temperatures, some portion of the liquid would be vaporized and the power input to the probes would increase to the additional power required to evaporate some portion of the liquid impacting the outer probe surfaces. This additional power would be a function of the liquid mass flow rate in stream 204 and would lead to a high and incorrect velocity reading as shown in FIG. 1.

To fully characterize the mass flow of a wet gas flow requires the measurement of any two of the three values: 1) mass flow of liquid phase material herein referred to as liquid, 2) mass flow of gas phase material herein referred to as gas or vapor, or 3) total mass flow of liquid and vapor. By operating the two probes 215, 216 or 315, 316 at different temperatures above the temperature of stream 204, they will operate at two power levels and provide two pieces of information that should be sufficient to calculate two of the required values to fully characterize the wet gas flow if the two pieces of information are mathematically independent.

In the following discussion, the low DeltaT probe is referred to as LDT (Low DeltaT) and the high DeltaT probe is referred to as HDT (High DeltaT). As noted above, a single heated probe can be used and LDT and HDT can refer to the state of operation of the single probe when it is at the Low DeltaT condition and the High DeltaT condition, respectfully.

Calculation Scheme 1

Scheme 1 will be described with a dual DeltaT sensor in a wet air stream with liquid water droplets. However, it should be noted that this procedure can be applied to any vapor mixture with a liquid phase component.

The calibration of the LDT and the HDT probes in air will produce two curves relating the power supplied to the two probes, Q in watts ($Q_{aircal}$), versus air mass flow, $M_{air}$. Since in dry air the only significant heat loss mechanism versus flow is the gas phase convective heat loss, $Q_{conv}$, the calibration curve essentially relates $Q_{conv}$ to $M_{air}$.

$$Q_{aircal\text{-}LDT} = f_{aircal\text{-}LDT}(M_{air}) = Q_{conv\text{-}LDT} \qquad \text{eqn. 1}$$

$$Q_{aircal\text{-}HDT} = f_{aircal\text{-}HDT}(M_{air}) = Q_{conv\text{-}HDT} \qquad \text{eqn. 2}$$

Functions $f_{aircal\text{-}LDT}$ and $f_{aircal\text{-}HDT}$ are the calibration curves relating the mass flow of air to heat losses from the LDT and HDT probes respectively. Typical calibration curves for a LDT probe and a HDT probe are shown in FIG. 4.

In operation of the dual DeltaT sensor in a wet air stream at a measurement point 1, the LDT and HDT probes will give instantaneous readings $Q1_{meas\text{-}LDT}$ and $Q1_{meas\text{-}HDT}$ respectively. In this wet air stream, a measured heat loss value will include a gas phase convective component from the air flow past a probe and a liquid phase convective component, such as a vaporization component, from liquid water that impacts the probe and is vaporized. Assume for these calculation procedures that the liquid water impacting a probe will be fully vaporized. Partial vaporization will be discussed later.

$$Q1_{meas\text{-}DT} = Q1_{vap\text{-}LDT} + Q1_{conv\text{-}LDT} \qquad \text{eqn. 3}$$

$$Q1_{meas\text{-}HDT} = Q1_{vap\text{-}HDT} + Q1_{conv\text{-}HDT} \qquad \text{eqn. 4}$$

$Q1_{vap\text{-}LDT}$ and $Q1_{vap\text{-}HDT}$ are the probe liquid phase convective heat loss components due to vaporization of the liquid striking the LDT and HDT probes, and $Q1_{conv\text{-}LDT}$ and $Q1_{conv\text{-}HDT}$ are the probe gas phase convective heat loss components due to the flowing air at this operating point 1.

As shown in the discussion of FIG. 1 at a high DeltaT operating point, $Q_{vap\text{-}HDT}$ small compared to $Q_{conv\text{-}HDT}$ so it can be assumed that $$Q1_{meas\text{-}HDT} = Q1_{conv\text{-}HDT}, \qquad \text{eqn. 5}$$

and eqn. 2, the air calibration curve for the HDT probe can be used to determine the mass flow of air, $M1_{air}$. Since both the HDT and the LDT probes are in the same flowing wet stream, the air mass flow is the same for both sensors and this $M1_{air}$ can be used in eqn. 1 to calculate the heat loss expected for just the gas phase convective air flow on the LDT probe, $Q1_{conv\text{-}LDT}$, in eqn. 6.

$$Q_{aircal\text{-}LDT} = f_{aircal\text{-}LDT}(M1_{air}) = Q1_{conv\text{-}LDT} \qquad \text{eqn. 6}$$

This calculated gas phase convective heat loss in the LDT probe can be substituted into eqn. 3, the equation solved for the vaporization heat loss on the LDT, and $Q1_{vap\text{-}LDT}$ calculated as in eqn. 7.

$$Q1_{vap\text{-}LDT} = Q1_{meas\text{-}LDT} - Q1_{conv\text{-}LDT} \qquad \text{eqn. 7}$$

Since the liquid water mass fraction flowing over the LDT and the HDT are the same, the vaporization heat loss on the HDT and the LDT probes are the same.

$$Q1_{vap\text{-}LDT} = Q1_{vap\text{-}HDT} \qquad \text{eqn. 8}$$

This calculated value of vaporization heat loss on the HDT probe is the small error that was ignored in making the assumption in eqn. 5. Now there is a way to correct this assumption by subtracting the vaporization heat loss from the measured heat loss on the HDT probe to obtain a corrected gas phase convective heat loss on the HDT probe, $Q1c_{conv\text{-}HDT}$.

$$Q1c_{conv\text{-}HDT} = Q1_{meas\text{-}HDT} - Q1_{vap\text{-}LDT} \qquad \text{eqn. 9}$$

This corrected gas phase convective heat loss is then used to calculate a more accurate $Mc_{air}$ using the calibration function, eqn. 2, solved for $M_{air}$ where the f' function is the calibration equation solved for $M_{air}$ and the value of $Q1c_{conv\text{-}HDT}$ used as the heat loss.

$$Mc_{air} = f'_{aircal\text{-}HDT}(Q1c_{conv\text{-}HDT}) \qquad \text{eqn. 10}$$

This will be a more accurate $Mc_{air}$ value since the procedure has corrected for the small error associated with the liquid vaporization heat loss on the HDT probe. The process from eqn. 5 through eqn. 10 can be repeated several more cycles to improve the reported value of $M_{air}$, thus making the dual DeltaT sensor a more accurate sensor for the mass flow of vapor in a wet gas stream. Controller software can perform this correction calculation in real time so that a continuous corrected $M_{air}$ value is output.

One assumption made in Calculation Scheme 1 is $Q_{vap\text{-}LDT} = Q_{vap\text{-}HDT}$ in eqn. 8. This assumes that the amount of liquid vaporized on the LDT probe is equal to the amount of liquid vaporized on the HDT probe. This may be true if the surface area of the two probes heated above the boiling point of the liquid, 100° C. for water in this test case, or heated above the stream temperature sufficiently to vaporize some or all of the liquid impacting the probes, are the same for both the LDT and the HDT probes. If the DeltaT of the HDT probe is much higher than the DeltaT for the LDT probe, then the surface area of the HDT probe vaporizing water may be slightly larger than the LDT probe. This source of error can be compensated by modifying eqn. 8 as shown in eqn. 11.

$$Q_{vap\text{-}HDT} = Q_{vap\text{-}LDT} \times [A_{HDT}/A_{LDT}] \qquad \text{eqn. 11}$$

$A_{LDT}$ and $A_{HDT}$ are the cross sectional areas of the LDT and the HDT probes, respectively, that are heated sufficiently to cause heat loss from the liquid component. An estimate of the cross sectional area ratio shown in eqn. 11 can be determined by infrared imaging of the probe under operating conditions or by a calibration test with a liquid containing stream. This ratio could also be a function of the vapor mass flow and the liquid mass flow since both of these flows will extract heat from the probe and could reduce the heated zone area. These area values can be determined versus the vapor flow velocity and liquid mass flow and a correction factor determined and applied to the probe area values.

Calculation Scheme 2

Another implementation of the correction scheme may be as follows. The heat loss quantities reported by the LDT and the HDT probes, $Q1_{meas\text{-}LDT}$ and $Q1_{meas\text{-}HDT}$, are given by eqns. 3 and 4 above. When these Q values are substituted into the calibration equations, eqn. 1 and 2, different mass flow of air flow values, $M_{air}$, will be calculated since the magnitude of heat loss to the liquid has a large impact on the LDT probe and a small impact on the HDT probe as shown in FIG. 3.

The calibration eqns. 1 and 2 can be rearranged to a form expressing $M_{air}$ in terms of the measured Q and the rearranged calibration function, f', with the Q1 values corrected for vaporization heat loss by subtracting the vaporization heat loss.

$$M1_{LDT} = f_{aircal\text{-}LDT}(Q1_{meas\text{-}LDT} - Q1_{vap\text{-}LDT})\qquad\text{eqn. 12}$$

$$M1_{HDT} = f_{aircal\text{-}HDT}(Q1_{meas\text{-}HDT} - Q1_{vap\text{-}HDT})\qquad\text{eqn. 13}$$

At any given measurement point, the mass flow rate of air, $M_{air}$, should be the same for both the HDT and the LDT probes since they are both in the same flow stream and the stream is assumed to be uniform. Also, the heat lost to vaporization of the liquid component, $Q1_{vap}$, should be the same for the HDT and the LDT probes since the liquid mass flow is the same for both probes because the flow stream is assumed to be uniform. Thus, eqns. 12 and 13 can be rewritten as eqns. 14 and 15 where the vaporization heat loss is a correction value, $Q1_{vap\text{-}corr}$.

$$M1_{air\text{-}LDT} = f_{aircal\text{-}LDT}(Q1_{meas\text{-}LDT} - Q1_{vap\text{-}corr})\qquad\text{eqn. 14}$$

$$M1_{air\text{-}HDT} = f_{aircal\text{-}HDT}(Q1_{meas\text{-}HDT} - Q1_{vap\text{-}corr})\qquad\text{eqn. 15}$$

Controller software can be used to insert an assumed value of $Q_{vap\text{-}corr}$ to both eqns. 14 and 15, and this inserted correction value can be iterated until both eqns. 14 and 15 give the same value for $M1_{air}$. This value of M1 may be the corrected $M_{air}$ value at this operating point. The controller software can perform this correction calculation in real time so that a continuous corrected $M_{air}$ value is output.

Calculation Scheme 3

Figure 7:
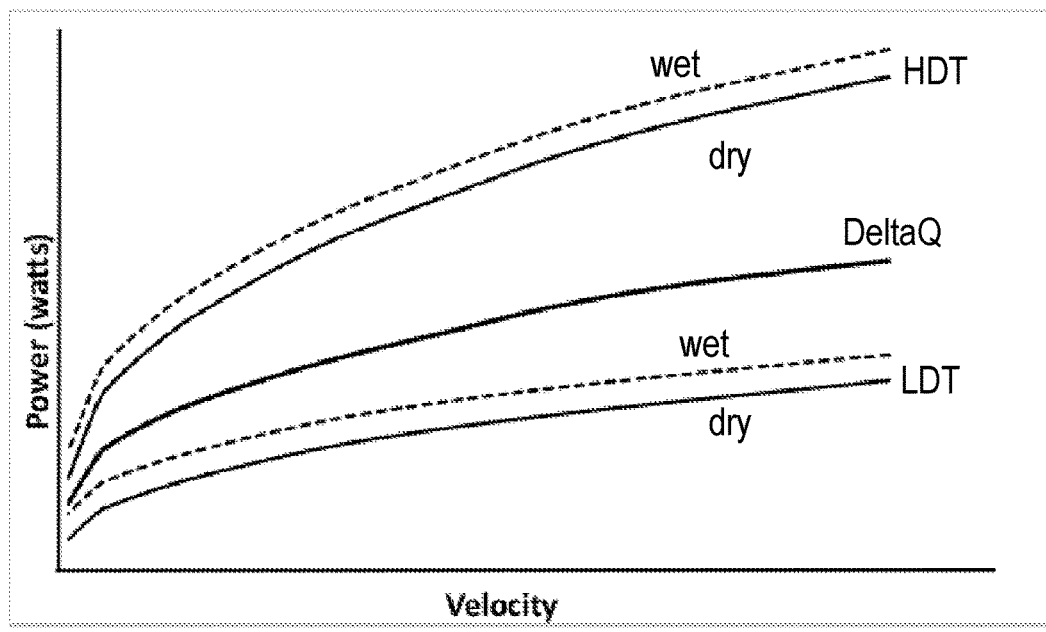
FIG. 7 is a chart illustrating high DeltaT, low DeltaT, and delta power calibration curves for thermal anemometer probes in examples of the present disclosure.

Calculation Scheme 3 is a variation of calculation scheme 2. FIG. 7 shows two dry calibration curves, one for the HDT probe and one for the LDT probe. If there are liquid droplets in the flow stream, then the dashed "wet" curves result as shown in the figure. For a fixed or constant mass flow of liquid, the heat loss due from vaporization, $Q_{vap}$, would be constant across the velocity curves to yield a wet curve located above a dry curve by $Q_{vap}$ and $Q_{vap}$ is the same for both the LDT and the HDT probes. Note that the delta between the LDT and the HDT dry curves is the same as the delta between the LDT and the HDT wet curves since the wet curves are offset from the dry curves by a constant amount.

In this scheme, the dry flow calibration curve for the LDT probe is subtracted from the dry flow calibration curve for the HDT probe to obtain a DeltaQ calibration curve (Delta Power) as shown in FIG. 7 in examples of the present disclosure. This calibration curve can then be used at any wet flow point by subtracting the LDT power from the HDT power at that flow point and then plugging this power difference into the DeltaQ calibration curve to determine the corrected vapor flow of the stream. This procedure may save computation time and give a faster flow sensor response time.

Calculation Scheme 4—Calculation of $M_{liq}$, the Mass Flow of Liquid Component Data from a dual DeltaT sensor can be used to calculate the mass flow of the liquid component. Calculation Scheme 1 in eqn. 7 calculates a value for $Q1_{vap}$-LDT and since both the LDT and the HDT probes may have the same heat loss due to liquid vaporization, $Q1_{vap\text{-}LDT}\ Q1_{vap\text{-}HDT} = Q1_{vap}$. Calculation Scheme 2 in eqns. 14 and 15 calculates a value for $Q1_{vap\text{-}corr}$ that is equal to $Q1_{vap}$ for both the LDT and the HDT probes. This vaporization heat loss can be expressed in terms of the heat of vaporization, $h_{vap}$, and the surface area of the probe that is hot enough to vaporize the liquid impacting the probe as shown in eqn. 16. This equation can be solved for $M_{liq}$, allowing the calculation of the mass flow of liquid $M1_{liq}$ as shown in eqn. 17.

$$Q1_{vap} = M1_{liq} \times h_{vap} \times A_{LDT}\qquad\text{eqn. 16}$$

$$M1_{liq} = Q1_{vap}/[h_{vap} \times A_{LDT}]\qquad\text{eqn. 17}$$

As described earlier, the heated probe area, $A_{LDT}$, can be determined by measurement of the temperature profile of the LDT probe either by a physical measurement, by infrared thermal imaging, or other techniques known in the art. Also, $A_{LDT}$ or the combination $A_{LDT} \times h_{vap}$ can be determined by a calibration in a flowing stream with air or other vapor with a known mass flow of liquid. Such a calibration curve or calibration function could also be done over a range of stream velocities and liquid mass flow rates. Determination of $M_{liq}$ together with the measurement of a corrected vapor flow allows the calculation of steam quality in a saturated steam flow. Steam quality is typically defined as the ratio of the mass flow of steam vapor divided by the total mass flow of liquid water and steam vapor.

The calculation schemes describe above are just examples of how a corrected vapor (gas) velocity or mass flow and a liquid mass flow can be determined using two measurements of heat loss from thermal anemometer probes operated at two different temperatures. The concept of the present disclosure is not limited to the specific calculation procedures described but can be accomplished with other calculation procedures. While in the above example calculations for a CTA or CDTA anemometer Q is measured directly, the same concept can be applied to a CPA or other thermal anemometer types where temperature or a combination of temperature change and power change are measured. The calculation would be more complicated but the measurements from two probes operating at two different DeltaT values could be used to determine a more accurate vapor (gas) velocity and liquid mass flow. The concept is to use two heat loss measurements to obtain accurate vapor mass flow and liquid mass flow in a vapor stream containing liquid droplets.

The magnitude of the DeltaT values used in the LDT and the HDT probes can vary from 1 to 1,000° C. In one example the LDT probe is operated with a DeltaT of 1 to 500° C. and the HDT probe is operated from 10 to 1,000° C. In another example, the LDT probe is operated from 5 to 100° C. and the HDT probe is operated from 10 to 1,000° C. In another example, the LDT probe is operated with a DeltaT from 1 to 1,000° C. and the HDT probe is operated with a DeltaT above the DeltaT of the LDT probe by 1 to 1,000° C. The selection of DeltaT values for the LDT and the HDT probes would be such that LDT DeltaT is substantially lower than HDT DeltaT so that the LDT probe shows a small heat loss from gas phase convection and a proportionately large heat loss from liquid phase convection (liquid vaporization) of the liquid component. The HDT probe DeltaT would be substantially higher so that the major heat loss from the HDT probe would be from gas phase convection and a smaller fraction from liquid phase convection (liquid vaporization). The upper limit DeltaT for the HDT probe is a function of the high temperature capability of the HDT probe and the long term durability when operated at high temperature.

The examples shown in FIGS. 2 and 3 show probes 210, 215, 216 and probes 310, 315, 316 located in a main flow duct 202. Other examples could locate one or all of the probes inside a flow body such as described in U.S. Pat. No. 8,549,908, U.S. Pat. No. 8,607,642, U.S. patent application Ser. No. 13/869,953, filed on Apr. 24, 2013, and U.S. Patent App. Ser. No. 61/737,860, filed on Dec. 17, 2012, which are commonly assigned and incorporated herein by reference. Still other examples could locate the probes in a side stream where a portion of a main flow 204 is diverted into a side stream and the probes located in this side stream. The side stream can be either vented or returned to the main stream flow. These implementations can incorporate designs or internal structures to remove some portion of the liquid droplets in the stream so that the LDT and the HDT probes see a lower mass flow of liquid.

In general unheated probe 210 in FIG. 2 and unheated probes 310, 311 in FIG. 3 are located upstream of heated probes 215, 216 in FIG. 2 and heated probes 315, 316 in FIG. 3 since the heated probes could increase the temperature of stream 204. Probes 215 and 216 are shown with probe 215 upstream of probe 216 for clarity in FIG. 2A. Probes 215 and 216 may be positioned in the same axial location in duct 202, or probe 216 could be located upstream of probe 215 (not shown). In general probes 215 and 216 in FIG. 2 should not be placed in the same flow streamline since one probe may heat the flow passing over the other probe. Similarly, in the single sensor version 301 shown in FIG. 3, heated probes 315 and 316 are shown in the same axial location but can be offset but may not be in the same streamline because one heated probe could heat the stream flow for the other heated probe.

Test Example

Figure 5:
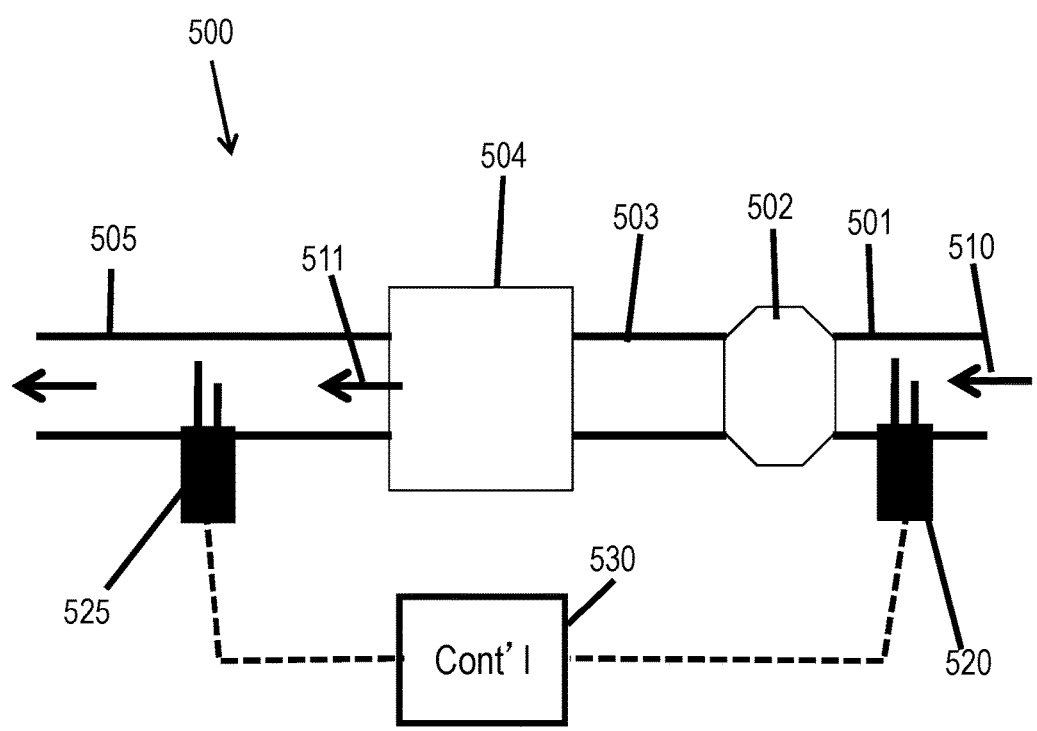
FIG. 5 shows a test system to evaluate a thermal anemometer flow meter in both dry and wet flow streams.

To demonstrate the utility of the concept in the present disclosure, tests were done in a system 500 shown in FIG. 5 in examples of the present disclosure. A flow duct 501 is connected to a blower fan 502, a flow duct 503, an ultrasonic mist generator 504, and a flow duct 505. A flow stream 510 is ambient air and a sensor 520 is a conventional thermal anemometer that measures air velocity of this inlet air flow stream. Mist generator 504 adds liquid water mist to air stream 510 so that a flow stream 511 is a wet air stream containing liquid water mist that then passes over a sensor 525. Sensor 525 is a combined dual DeltaT sensor similar to sensor 301 in FIG. 3 with two unheated probes upstream of two heated probes. A first heated probe was operated with a DeltaT of 75° C. and a second heated probe with operated with a DeltaT of 300° C. Data was collected with the mist injector off so that the dry air stream flowed over both sensors 520 and 525. The mist generator was then turned on and wet air containing liquid water flowed over sensor 525.

Figure 6:
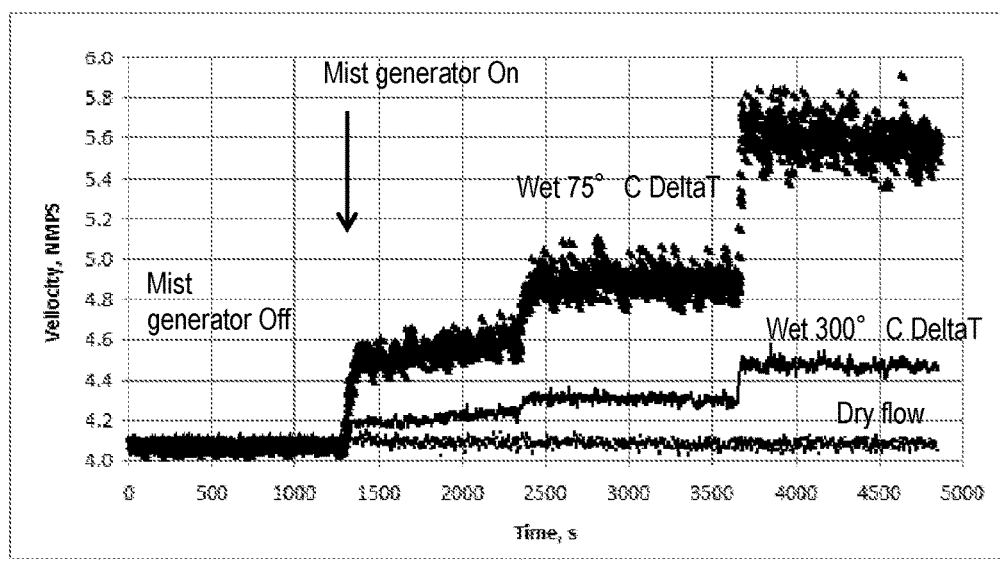
FIG. 6 shows test data for a thermal anemometer flow meter with a high DeltaT probe and a low DeltaT probe in dry and wet streams in examples of the present disclosure.

FIG. 6 shows the data from dry flow sensor 520, and dual DeltaT wet sensor 525 with two signals, one for the 75° C. DeltaT probe and one for the 300° C. DeltaT probe, in examples of the present disclosure. The signal for the dry sensor remains relatively steady at 4.2 NMPS (normal meters per second velocity). When the ultrasonic mist generator is turned on at a low power setting from about 1,250 s to 2,300 s, the 300° C. DeltaT probe shows a small increase due to the liquid mist while the 75° C. DeltaT probe shows a rather large increase in signal. The mist generator power level was increased from 2,300 s to 3,600 s and again increased from 3,600 s to 4,800 s. The increased signal output from the 75° C. and 300° C. DeltaT probes is consistent with the performance expected as shown in FIG. 1 with the higher DeltaT probe showing reduced effect from the liquid mist in the flow stream.

Table 1 show this data averaged over the last 300 s of each period, dry air only, mister power level 1, 2 and 3. The wet measurement with the 300° C. high DeltaT probe (line 4) shows an error ranging from 3.48% to 9.62% at the three mist levels while the 75° C. low DeltaT probe (line 3) shows errors of 12.26 to 36.93%. However, applying the Calculation Scheme 2 whereby a heat loss value (line 9) is subtracted from both the 75° C. and 300° C. probes until both probes show the same vapor (gas) velocity gives a value that is closer to the dry flow rate (line 10) with the error (line 12) reduced to 0.41%, 0.27%, and 0.05% for the three mist levels. Essentially the same result is obtained applying Calculation Scheme 1 and Calculation Scheme 3. The ability of the correction schemes to obtain an accurate measurement of the air flow shows the utility of this approach and the very high level of accuracy obtained is unexpected.

TABLE 1

| | | Mister off | Mist level 1 | Mist level 2 | Mist level 3 |
|---|---|---|---|---|---|
| | Test data | | | | |
| 1 | Averaging time, s | 900 to 1250 | 2000 to 2300 | 3300 to 3650 | 4500 to 4850 |
| 2 | Average velocity Dry Sensor, NMPS | 4.06 | 4.09 | 4.07 | 4.08 |
| 3 | Average velocity 75° C. probe | 2.08 | 4.59 | 4.89 | 5.58 |
| 4 | Average velocity 300° C. probe | 4.06 | 4.23 | 4.29 | 4.47 |
| 5 | Error 75° C. probe | 0.61 | 12.26 | 20.06 | 36.93 |
| 6 | Error 300° C. probe | 0 | 3.48 | 5.44 | 9.62 |
| 7 | | | | | |
| 8 | Correction of 300° C. probe velocity uning Calculation Scheme 2 | | | | |
| 9 | Vaporization heat loss correction, watts | | 0.076 | 0.125 | 0.226 |
| 10 | Corrected velocity, NMPS | | 4.1 | 4.08 | 4.08 |
| 11 | Error 300° C. probe before correction, % | | 3.48 | 5.44 | 9.62 |
| 12 | Error 300° C. probe after correction, % | | 0.41 | 0.27 | 0.05 |

While the above analysis of the effect of liquid droplets on the heat loss from a thermal anemometer probe discusses the effect in terms of vaporization of the liquid, the probe surface does not have to be above the boiling point of the liquid at the conditions in the flowing stream. The example data demonstrating the effect used one probe at a DeltaT of 75° C. The stream temperature was 19° C. so the probe temperature was controlled at 94° C., below the boiling point of the liquid, which is 100° C. for water. Similar tests were done with low DeltaT probe operating at a DeltaT of 10° C. and the correction scheme shown to provide a more accurate vapor (gas) velocity. This may be because even at low DeltaT values, when the probe is at a temperature above the stream temperature, liquid contacting the probe surface would vaporize. Full vaporization could occur at low liquid mass flow rates. Even if vaporization is minimal, the effect of water contacting the probe could lose heat through conduction to the liquid coating the probe to raise the temperature of the liquid film. In one example, the correction could be based on the heat capacity of the liquid for both probes and a similar correction scheme developed. In another example, one probe operated at a high temperature could be corrected for vaporization heat loss and the other probe operated at a low temperature for liquid heat capacity heat loss. In addition, the probe operating temperature could be a function of the liquid mass flow as estimated by the calculation schemes described above and the calculation scheme adjusted for full vaporization, just heating of the liquid on the probe with no vaporization, or a combination of these correction schemes. Furthermore, the probe DeltaT could be changed based on the estimated liquid mass flow to move the probe into one specific heat loss regime.

In another example, liquid droplets or mist of a very high boiling point component in a vapor stream could be treated in the same way. With a very high boiling point, no vaporization would occur but the liquid contacting and coating the probes would induce an additional heat loss as the probe heat the liquid and this liquid then runs off the probe. The liquid phase convective heat loss would be due to sensible heating of the liquid with no vaporization occurring. This liquid phase convective heat loss from each probe would be equal to the liquid heat capacity times the probe area times the DeltaT for each probe. So the calculation process would be the same with the exception that the liquid phase convective heat loss from the LDT probe would be multiplied by the LDT-DeltaT and the heat loss from the HDT probe would be multiplied by HDT-DeltaT.

Thermal anemometer sensors in FIGS. 2 and 3 may be controlled by the universal controller described in U.S. Pat. Nos. 7,418,878 and 7,647,843. This would be a mode of operating the sensors in FIGS. 2 and 3 where one unheated probe is shared by two heated probes, a single heated probe operate at two different DeltaT values, or a single probe operated as both a heated probe at two DeltaT's and unheated for measurement of the stream temperature.

The discussion above of a fixed DeltaT operation is typically called the constant temperature anemometer (CTA) or the constant DeltaT anemometer (CDTA). Another anemometer mode of operation is the constant power anemometer (CPA) where the heater power if fixed and the temperature of the probe is monitored and correlated with stream velocity. In one example of the present disclosure, a first temperature is measured from a first heated probe operated at a first heater power level, and a second temperature is measured from a second heated probe operated at a second heater power level where the second power level being higher than the first power level. A vapor (gas) velocity of the stream is then determined based on the first and the second temperatures. Operating two heated probes at two different power levels would result in the probes at different temperatures effectively generating data in which the low temperature probe has a large percentage effect (temperature change) due to liquid droplets in the stream while the high temperature probe has a smaller percentage effect (temperature change) due to liquid droplets. While not as straight forward, these two operating points reporting different probe temperature changes can be processed to correct for the effect of liquid in the vapor stream. This is also the case with so called "hybrid" anemometers where both the power and temperature change are both recorded and the ratio or some other combination of power and temperature change correlated to velocity.

In some examples of the present disclosure, the liquid phase convective component of the measured heat loss may be due to both vaporization and sensible heating. In other words, a fraction of the liquid phase convective component is due to vaporization and the other is due to sensible heating. In such a scenario, a thermal anemometer flow meter with three DeltaTs would be able to solve for the additional variable due to the presence of both vaporization and sensible heating using the principals described in the present disclosure.

Various other adaptations and combinations of features of the embodiments disclosed are within the scope of the invention. Numerous embodiments are encompassed by the following claims.

What is claimed is:

1. A thermal anemometer flow meter to measure a stream property of a wet stream including a liquid phase component, comprising:
one or more sensors comprising one or more probes, the one or more sensors being configured to:
heat a first probe in the wet stream to a first DeltaT above a temperature of the wet stream; and
heat the first probe or a second probe in the wet stream to a second DeltaT above the temperature of the wet stream, the second DeltaT being greater than the first DeltaT; and a controller coupled to the one or more sensors, the controller being configured to:
receive, from the one or more sensors, a first heat loss to the wet stream from heating the first probe to the first DeltaT;
receive, from the one or more sensors, a second heat loss to the wet stream from heating the first probe or the second probe to the second DeltaT; and
determine a value of the stream property of the wet stream based on the first and the second heat losses by:
determining a delta power calibration curve by subtracting a first dry flow calibration curve for the first DeltaT from a second dry flow calibration curve for the second DeltaT;
determining a power difference by subtracting the first heat loss from the second heat loss; and
using the power difference to determine a corresponding vapor flow from the delta power calibration curve.

2. A method for a thermal anemometer flow meter to measure a stream property of a wet stream including a liquid phase component, the method comprising:
operating one or more sensors by:
heating a first probe in the wet stream to a first DeltaT above a temperature of the wet stream; and
heating the first probe or a second probe in the wet stream to a second DeltaT above the temperature of the wet stream, the second DeltaT being greater than the first DeltaT;
providing, from the one or more sensors to a controller, a first heat loss to the wet stream from heating the first probe to the first DeltaT;
providing, from the one or more sensors to the controller, a second heat loss to the wet stream from heating the first probe or the second probe to the second DeltaT; and
determining, using the controller, a value of the stream property of the wet stream based on the first and the second heat losses, comprising:
determining a delta power calibration curve by subtracting a first dry flow calibration curve for the first DeltaT from a second dry flow calibration curve for the second DeltaT;
determining a power difference by subtracting the first heat loss from the second heat loss; and
using the power difference to determine a corresponding vapor flow from the delta power calibration curve.

3. A thermal anemometer flow meter to measure a stream property of a wet stream comprising a vapor mixture, comprising:
one or more sensors each comprising one or more probes, the one or more sensors being configured to:
heat a first probe to a first DeltaT above a temperature of the wet stream; and
heat the first probe or a second probe to a second DeltaT above the temperature of the wet stream, the second DeltaT being greater than the first DeltaT;
a controller coupled to the one or more sensors, the controller being configured to:
receive, from the one or more sensors, a first value of a property of the first probe resulting from heating the first probe to the first DeltaT;
receive, from the one or more sensors, a second value of the property of the first probe or the second probe from heating the first probe or the second probe to the second DeltaT; and
determine a value of the stream property of the wet stream based on the first value of the property, the second value of the property, a first calibration relating the property from heating the first probe to the stream property of a dry stream without any liquid phase component, and a second calibration relating the property from heating the first probe or the second probe to the stream property of the dry stream without any liquid phase component.

4. The thermal anemometer flow meter of claim 3, wherein the one or more sensors comprise:
a first sensor comprising the first probe to measure a first heat loss;
a second sensor comprising the second probe to measure a second heat loss; and
a third sensor comprising a third probe to detect the temperature of the wet stream.

5. The thermal anemometer flow meter of claim 3, wherein the one or more sensors comprise a sensor with:
the first probe to measure a first heat loss;
the second probe to measure a second heat loss; and
third and fourth probes to detect the temperature of the wet stream.

6. The thermal anemometer flow meter of claim 3, wherein:
the one or more sensors comprise a sensor comprising the first probe:
the controller is configured to:
operate the first probe in a non-heated mode to detect the temperature of the wet stream;
operate the first probe in a heated mode at the first DeltaT to measure a first heat loss; and
operate the first probe in the heated mode at the second DeltaT to measure a second heat loss.

7. The thermal anemometer flow meter of claim 3, wherein:
the one or more sensors comprise a sensor comprising:
the first probe to measure first and second heat losses; and
a third probe to detect the temperature of the wet stream; and
the controller is configured to:
operate the first probe at the first DeltaT to measure the first heat loss; and
operate the first probe at the second DeltaT to measure the second heat loss.

8. The thermal anemometer flow meter of claim 3, wherein:
the one or more sensors are configured to heat the first probe to the first DeltaT by maintaining the first probe at the first DeltaT;
the one or more sensors are configured to heat the first probe or the second probe to the second DeltaT by maintaining the first probe or the second probe at the second DeltaT;
the property comprises a power supplied to the one or more probes;
the first calibration relates the power supplied to maintain the first probe at the first DeltaT to the stream property of the dry stream without any liquid phase component; and
the second calibration relates the power supplied to maintain the first probe or the second probe at the second DeltaT to the stream property of the dry stream without any liquid phase component.

9. A method for a thermal anemometer flow meter to measure a stream property of a wet stream, comprising:
operating one or more sensors by:
heating a first probe in the wet stream to a first Delta T above a temperature of the wet stream; and
heating the first probe or a second probe in the wet stream to a second DeltaT above the temperature of the wet stream, the second DeltaT being greater than the first DeltaT;
providing, from the one or more sensors to a controller, a first value of a property of the first probe resulting from heating the first probe to the first DeltaT;
providing, from the one or more sensors to the controller, a second value of the property of the first probe or the second probe from heating the first probe or the second probe to the second DeltaT; and
determining, using the controller, a value of the stream property of the wet stream based on the first value of the property, the second value of the property, a first calibration relating the property from heating the first probe to the stream property of a dry stream without any liquid phase component, and a second calibration relating the property from heating the first probe or the second probe to the stream property of the dry stream without any liquid phase component.

10. The method of claim 9, wherein:
heating the first probe to the first DeltaT by maintaining the first probe at the first DeltaT;
heating the first probe or the second probe to the second DeltaT by maintaining the first probe or the second probe at the second DeltaT;
the property comprises a power supplied to the one or more probes;
the first calibration relates the power supplied to maintain the first probe at the first DeltaT to the stream property of the dry stream without any liquid phase component; and
the second calibration relates the power supplied to maintain the first probe or the second probe at the second DeltaT to the stream property of the dry stream without any liquid phase component.

* * * * *